May 19, 1931.  B. F. RANDEL  1,806,498
REFRIGERATING MEANS AND METHOD
Filed May 11, 1927   2 Sheets-Sheet 1

INVENTOR.
Bo Folke Randel
BY A. B. Bowman
ATTORNEY

Patented May 19, 1931

1,806,498

UNITED STATES PATENT OFFICE

BO FOLKE RANDEL, OF SAN DIEGO, CALIFORNIA, ASSIGNOR TO ELECTROLUX SERVEL CORPORATION, OF NEW YORK, N. Y., A CORPORATION OF DELAWARE

REFRIGERATING MEANS AND METHOD

Application filed May 11, 1927. Serial No. 190,604.

My invention relates to refrigerating apparatus and method, more particularly to the absorption type of refrigeration, and the objects of my invention are: first, to provide a refrigeration apparatus which is operated by reason of the solubility of various gases and the progressive compressing of one gas by removing the others by liquefying; second, to provide an apparatus of this class which is operated by reason of variation of pressure of the gases caused by heating, then cooling and separating, then expanding, and then dissolving; third, to provide an apparatus of this class in which the refrigerating energy is primarily produced by heating gases in a generator; fourth, to provide an apparatus of this class in which the gases in which the cooling medium is expanded are not under constant pressure by reason of changes in pressure during its passage through the apparatus from a lower pressure to a maximum pressure, then to an expanded pressure, and finally back to its original pressure; fifth, to provide a noval apparatus for refrigeration; sixth, to provide a novel method of producing refrigeration; seventh, to provide a novel apparatus and method for producing refrigeration, and eighth, to provide an apparatus and method of this class which is very simple and economical of construction and operation, efficient in its action, durable, and which will not readily deteriorate or get out of order.

Figure 1:
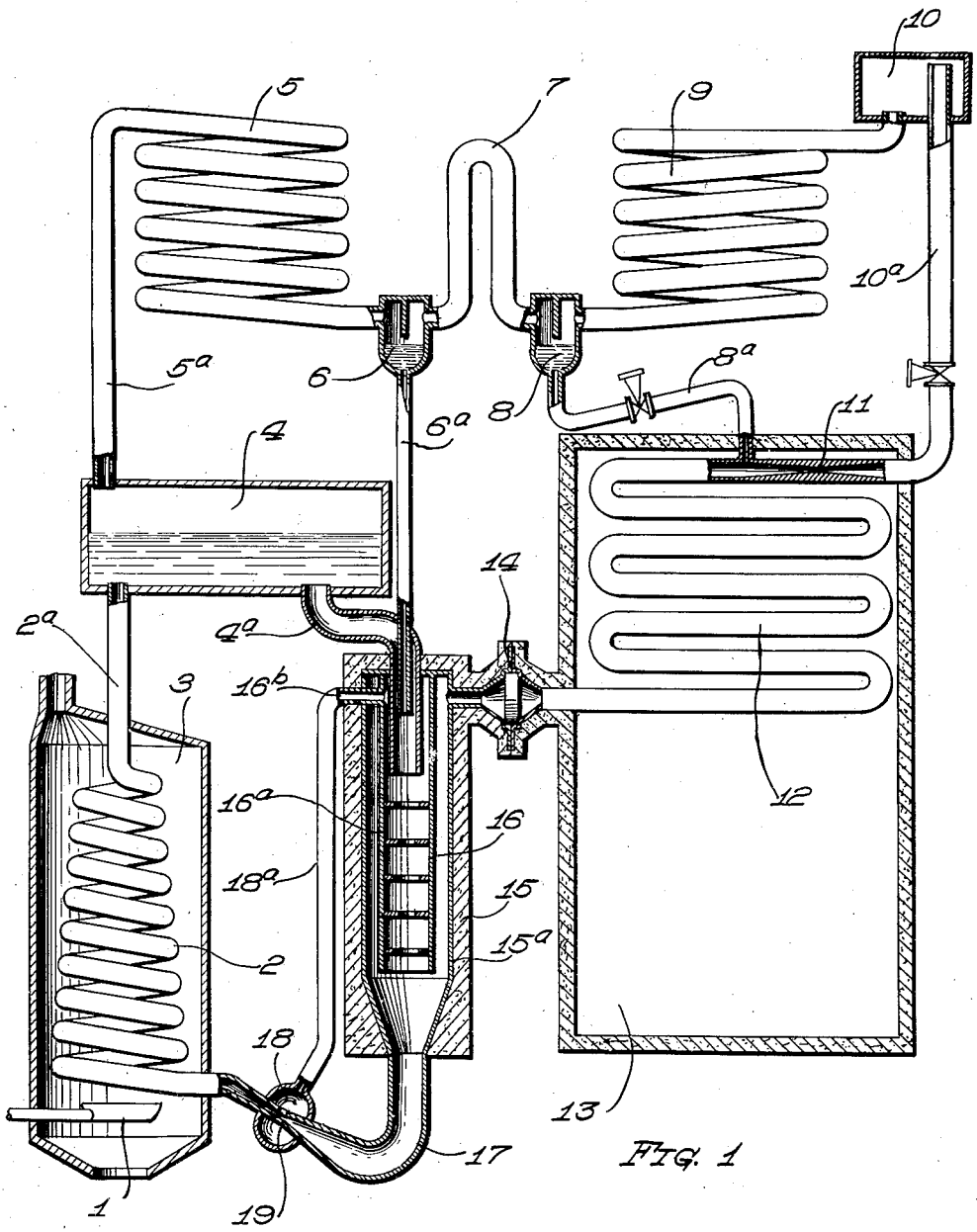
Figure 2:
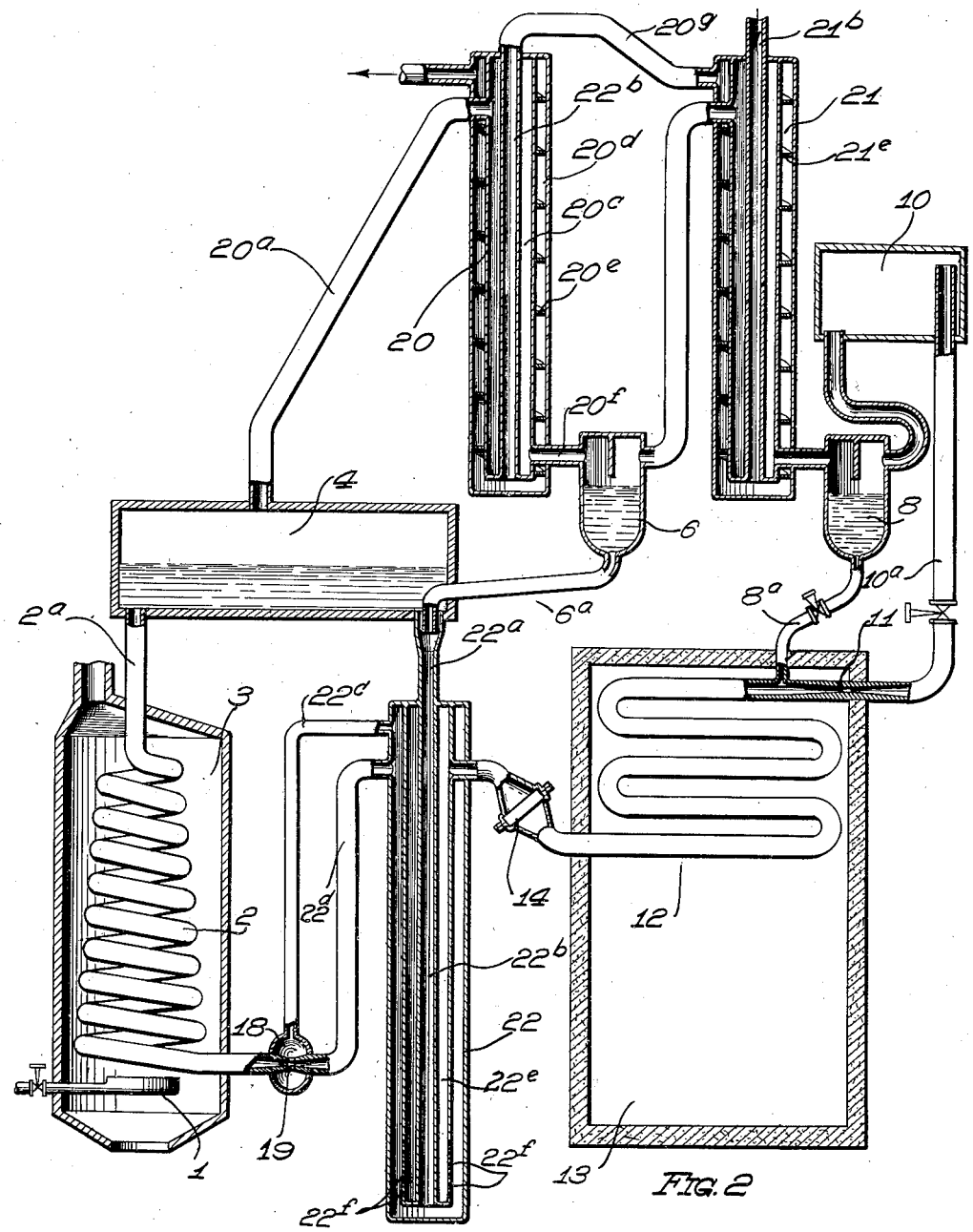

With these and other objects in view, as will appear hereinafter, my invention consists of certain novel features of construction, combination and arrangement of parts and portions and the certain novel method, as will be hereinafter described in detail and particularly set forth in the appended claims, reference being had to the accompanying drawings and to the characters of reference thereon, which form a part of this application, in which:

Figure 1 is a diagrammatic view of my refrigerating apparatus in one form, and Fig. 2 is a similar view of my refrigerating apparatus in a slightly modified form.

Similar characters of reference refer to similar parts and portions throughout the views of the drawings.

The burner 1, generator 2, generator casing 3, water receiver 4, alcohol condenser 5, alcohol receiver 6, gas-trap 7, ammonia liquid receiver 8, ammonia condenser 9, carbon dioxide receiver 10, expansion nozzle 11, refrigerating freezing coils 12, freezing coil casing 13, screen member 14, absorber 15, tubular member 16, conductor 17, and injector members 18 and 19, constitute the principal parts and portions of my refrigerating apparatus.

The several parts, as hereinbefore set forth, are connected together by tubular conductors, preferably by spot welding, so that they form one continuous and complete unit, which is gas-tight throughout. This apparatus is filled with predetermined portions of fluids, and it is preferred to use water, alcohol, ammonia and carbon dioxide, each under predetermined pressures and sealed within said apparatus.

The operation is as follows:

Heat is applied to the generator 2 by means of the burner 1, which may be any kind of burner, but it is preferred to use a gas burner. The combined liquid in the generator 2 will boil and rise from the generator through the tube 2a to the water receiver 4. The pressure in the system is such as to prevent much of the water from vaporizing in the receiver 4, and the ammonia, alcohol and carbon dioxide will separate from the water, leaving it in the receiver 4, and rise in the tube 5a to the alcohol condenser 5. In this condenser 5 the alcohol will liquefy and run down and collect in the receiver 6, leaving the carbon dioxide and ammonia gases to continue through the gas-trap 7 and ammonia receiver 8 to the ammonia condenser 9. This ammonia condenser 9 will liquefy the ammonia, which will flow back into the receiver 8, leaving the carbon dioxide gas to flow to the carbon dioxide receiver 10.

As an illustration we will assume that the heat is applied by reason of the burner 1 to provide the following partial pressures in the mixture in the receiver 4: ammonia, 182 pounds; carbon dioxide, 68 pounds; and alcohol, 50 pounds, thus providing a total of 300 pounds pressure throughout the system in order to maintain equilibrium. Through the progressive liquefying in the various condensers, the generator being steadily supplied with additional vapors to make up for the condensed vapors, the remaining carbon dioxide gas in its receiver 10 will assume the entire total pressure of 300 pounds, which will produce the following conditions: liquid ammonia gas in the receiver 8 under 300 pounds pressure, and carbon dioxide gas in the receiver 10 at 300 pounds pressure.

Now permit the carbon dioxide gas to expand in a permanent expansion nozzle 11, and, if desired, an expansion valve may be used here, the gas being expanded to 270 pounds or a drop in the pressure of 30 pounds. Then permit the ammonia liquid to flow into this 270 pounds carbon dioxide gas. In order to maintain the equilibrium of 300 pounds, the ammonia gas will assume the balance or 30 pounds, and the ammonia, 30 pounds, will have a temperature at zero. After the freezing mixture of ammonia and carbon dioxide gases has produced refrigeration in the freezing coils 12 in the casing 13, they pass through a screen 14, which is of porous material, which permits the lighter ammonia gas to pass readily, but holds the denser carbon dioxide back to a certain degree, but the whole passes into an absorber 15 between an outer casing 15a and an inner tubular member 16.

The warm water from the water receiver 4 passes downwardly through the tube 4a and mixes with the liquid alcohol from the alcohol receiver 6 through the tube 6a. The cool gases from the freezing coil 12 will cool this mixture by permitting the gases to flow down the annular space between the members 15 and 16, and the gases will mix at the lower end of the tubular member 16 with the water and alcohol by being led upwardly and meeting the liquids flowing downwardly through the perforated discs 16a, and will be absorbed in these liquids.

It will be noted that the upward movement of the gas is brought about by action of the injector, consisting of the members 18 and 19, through the opening 16b and tube 18a, and any gases not completely absorbed in the absorber will be drawn out through the exit 16b and mixed with the liquid at the injector. The combined mass of liquids and gas dissolved in the liquids will pass through the conductor 17 of the injector, consisting of the injector member 18 and Venturi tube 19, into the generator, thus completing the cycle.

It will be noted that this apparatus and process will operate without the use of alcohol. The function of the alcohol is to provide for complete solution of the carbon dioxide, alcohol being several times as effective for dissolving carbon dioxide as water is. The condensed alcohol vapor also assists in the gradual compression of the carbon dioxide in the complete total pressure.

It will also be noted that other combinations of fluids may be used, such as water, ammonia and carbon dioxide, with the alcohol omitted, or alcohol, methyl chloride and carbon dioxide, or alcohol, ethyl chloride and carbon dioxide, or any combination of gases dissolvable in the fluid used; provided, however, the combination of gases so used do not chemically interact.

It will also be noted that different styles of generator may be used, such as gas, steam, oil or electricity, or the condensers may be cooled in various ways, such as air-cooled, water-cooled and the like. Various forms of evaporating chambers and absorbers may be used. For instance, in the modified form of apparatus shown in Fig. 2, the apparatus is the same throughout, except there is provided a different form of condenser for condensing the alcohol and ammonia, and a different form of absorber.

In the apparatus shown in Fig. 2, the ammonia and alcohol vapors pass through the tube 20a to a condenser 20. The condenser 20 consists of a central tubular portion 20b, an intermediate concentric tubular portion 20c, and an outer tubular member 20d. Between the members 20c and 20d is provided a helical partition 20e, and the alcohol and ammonia vapors pass into the space between the inner and intermediate tubular portions at the upper end of the condenser and move downwardly and out through the tube 20f to the alcohol receiver 6, while the cooling water for the condenser passes through the central tube 21b to the lower end of the condenser 21, then upwardly in the passage between the outer and intermediate tubes in circular helical form, by reason of the helix 21e, to the upper end of the condenser 20 through a conductor 20g, then to the inner compartment of a similar condenser 20, and performs the same cycle through said condenser, thus moving in the opposite direction to the gas. The ammonia and carbon dioxide gases pass from the receiver 6 through the condenser 21 in the same manner as in the condenser 20 and out into the ammonia liquid receiver 8, and the carbon dioxide gases pass to the carbon dioxide receiver 10, after which they take the course as hereinbefore described.

The absorber 22 is different from the absorbers shown in Fig. 1 in that the hot water and alcohol mix in a tube 22a and pass downwardly through the central tube 22b to the bottom of the condenser 22, then upwardly through the outer portion and out through the tubes 22c and 22d, while the cool gases, after passing through the screen 14, enter the intermediate annular chamber 22e and pass downwardly and out through perforations 22f, intermingling with the water and alcohol which absorbs said gases, and the whole passes through the conductors 22c and 22d of the injector formed by the members 18 and 19, and back to the generator, which completes the cycle.

Though I have shown and described a particular construction, combination and arrangement of parts and portions, certain modifications thereof, a certain process and the use of certain fluid combinations, I do not wish to be limited to this particular construction, combination and arrangement nor to the modifications nor to the particular process, nor to the particular fluids, but desire to include in the scope of my invention, the construction, combination and arrangement of apparatus and the certain process substantially as set forth in the appended claims.

Having thus described my invention, what I claim as new and desire to secure by Letters Patent is:

1. In a refrigerating apparatus, a generator, a water receiver communicating therewith, an alcohol condenser communicating with said water receiver, an alcohol receiver communicating with said alcohol condenser, an ammonia condenser, an ammonia receiver communicating therewith, a carbon dioxide receiver communicating with said ammonia condenser, an expansion member communicating with said carbon dioxide receiver, a conductor connecting said ammonia receiver with the opposite side of said expansion member from said carbon dioxide receiver, a freezing coil in connection with said conductor and the expansion side of said expansion member, an absorber communicating with said freezing coil, and an injector communicating with said absorber for conducting the fluid contents back to the generator.

2. In a refrigerating apparatus, a closed and sealed circulating tubular apparatus provided with a plurality of various kinds of vaporizing fluids under predetermined pressures therein, means for heating said fluids, separate means for condensing the separate fluids, separate means for receiving the separate fluids, means for expanding one of said fluids, and means for conducting another fluid into the presence thereof after expansion.

3. In a refrigerating apparatus, a closed and sealed circulating tubular apparatus provided with a plurality of various kinds of vaporizing fluids under predetermined pressures therein, means for heating said fluids, separate means for condensing the separate fluids, separate means for receiving the separate fluids, means for expanding one of said fluids, means for conducting another fluid into the presence thereof after expansion, and means for reabsorbing the vapors from some of said fluids into other of said fluids.

4. The herein described method of refrigeration, consisting in vaporizing a plurality of various kinds of vaporizing gases which are absorbed in a liquid medium which vaporizing is for the purpose of releasing the absorbed gases, then expanding one of said gases and intermingling the liquid from another gas therewith, and then reabsorbing said gases in said liquid.

5. The herein described method of refrigeration, consisting in producing a final high pressure in gas by progressive steps of removing gases from a mixture by condensing, thus accumulating all the partial pressures in the remaining gas.

6. The herein described method of refrigeration, consisting in confining a solution of water, alcohol, ammonia and carbon dioxide, then heating the mixture until vaporized, then successively compressing the carbon dioxide until it is compressed to the total pressure in the system, then expanding the carbon dioxide to a lower pressure, and then expanding liquid ammonia therein.

7. The herein described method of refrigeration, consisting in confining a solution of water, alcohol, ammonia and carbon dioxide, then heating the mixture until vaporized, then successively compressing the carbon dioxide until it is compressed to the total pressure in the system, then expanding the carbon dioxide to a lower pressure, then expanding liquid ammonia therein, and then reabsorbing the gases in the water and alcohol to complete the cycle.

8. In a refrigerating apparatus, a closed and sealed circulating apparatus containing a mixture of gases absorbed in liquids, each liquid under a predetermined pressure, means for heating said liquids for releasing said absorbed gases out of the liquids, means for collecting said gases, means for separating said released gases from each other by cooling, condensing and liquefying one of the same out of the mixture, separate means for receiving the condensed and liquefied gas, and the gas remaining in vaporized form, means for expanding said gas remaining in vaporized form to a lower pressure, and means for conducting the liquefied gas into the presence thereof after expansion causing evaporation of said liquefied gas into vapor form, thus forming a mixture of vaporized gases.

9. In a refrigerating apparatus, a closed and sealed circulating apparatus containing a mixture of gases absorbed in liquids, each liquid under a predetermined pressure, means for heating said liquids for releasing said absorbed gases out of the liquids, means for collecting said gases, means for separating said released gases from each other by cooling, condensing and liquefying one of the same out of the mixture, separate means for receiving the condensed and liquefied gas, and the gas remaining in vaporized form, means for expanding said gas remaining in vaporized form to a lower pressure, means for conducting the liquefied gas into the presence thereof after expansion causing evaporation of said liquefied gas into vapor form, thus forming a mixture of vaporized gases, and means for reabsorbing the said mixture of vaporized gases into the first mentioned liquids, thus completing the cycle.

10. In a refrigerating apparatus, a closed and sealed circulating apparatus containing a mixture of gases absorbed in liquids, each liquid under a predetermined pressure, means for heating said liquids for releasing said absorbed gases out of the liquids, means for collecting said gases, means for separating said released gases from each other by cooling, condensing and liquefying one of the same out of the mixture, separate means for receiving the condensed and liquefied gas, and the gas remaining in vaporized form, means for expanding said gas remaining in vaporized form to a lower pressure, means for conducting the liquefied gas into the presence thereof after expansion causing evaporation of said liquefied gas into vapor form, thus forming a mixture of vaporized gases, and means for partial separation of the said gases by the retardation of the flow of the heavier gas and hastening the flow of the lighter gas.

11. In a refrigerating apparatus, a closed and sealed circulating apparatus containing a mixture of gases absorbed in liquids, each liquid under a predetermined pressure, means for heating said liquids for releasing said absorbed gases out of the liquids, means for collecting said gases, means for separating said released gases from each other by cooling, condensing and liquefying one of the same out of the mixture, separate means for receiving the condensed and liquefied gas, and the gas remaining in vaporized form, means for expanding said gas remaining in vaporized form to a lower pressure, means for conducting the liquefied gas into the presence thereof after expansion causing evaporation of said liquefied gas into vapor form, thus formnig a mixture of vaporized gases, means for partially separating said gases by the retardation of the flow of the heavier gas and hastening the flow of the lighter gas, and means for reabsorbing the said mixture of vaporized gases into the first mentioned liquids, thus completing the cycle.

12. The herein described method of refrigeration, consisting in vaporizing a mixture of gases absorbed in liquid mediums for releasing said absorbed gas mixture from the said liquid mediums, then separating the said vaporized gases from each other by condensing and liquefying one of the gases out of the gas mixture, adding the total pressure in the system to the gas remaining in vapor form, then expanding the said gas remaining in vapor form to a lower pressure, then intermingling the liquefied gas with the said expanded gas, and causing said liquefied gas to evaporate and form a mixture with the expanded gas.

13. The herein described method of refrigeration, consisting in vaporizing a mixture of gases absorbed in liquid mediums for releasing said absorbed gas mixture from the said liquid mediums, then separating the said vaporized gases from each other by condensing and liquefying one of the gases out of the gas mixture, adding the total pressure in the system to the gas remaining in vapor form, then expanding the said gas remaining in vapor form to a lower pressure, then intermingling the liquefied gas with the said expanded gas, causing said liquefied gas to evaporate and form a mixture with the expanded gas, and then causing the said gas mixture to pass through a retarding substance thereby retarding the flow of the heavier gas and hastening the flow of the lighter gas.

14. The herein described method of refrigeration, consisting in vaporizing a mixture of gases absorbed in liquid mediums for releasing said absorbed gas mixture from the said liquid mediums, then separating the said vaporized gases from each other by condensing and liquefying one of the gases out of the gas mixture, adding the total pressure in the system to the gas remaining in vapor form, then expanding the said gas remaining in vapor form to a lower pressure, then intermingling the liquefied gas with the said expanded gas, causing said liquefield gas to evaporate and form a mixture with the expanded gas, and then causing the reabsorption of the gas mixture by the first mentioned liquids, thus completing the cycle.

15. The herein described method of refrigeration, consisting in vaporizing a mixture of gases absorbed in liquid mediums for releasing said absorbed gas mixture from the said liquid mediums, then separating the said vaporized gases from each other by condensing and liquefying one of the gases out of the gas mixture, adding the total pressure in the system to the gas remaining in vapor form, then expanding the said gas remaining in vapor form to a lower pressure, then intermingling the liquefied gas with the said expanded gas, causing said liquefied gas to evaporate and form a mixture with the expanded gas, then causing the said gas mixture to pass through a retarding substance thereby retarding the flow of the heavier gas and hastening the flow of the lighter gas, and then causing a reabsorption of the gas mixture by the first mentioned liquids, thus completing the cycle.

In testimony whereof, I have hereunto set my hand at San Diego, California, this 5th day of May, 1927

BO FOLKE RANDEL.